United States Patent
Dudra

(10) Patent No.: US 7,171,982 B2
(45) Date of Patent: *Feb. 6, 2007

(54) HYDRAULIC FLUID RESERVOIR AND HYDRAULIC SYSTEM

(75) Inventor: Brian Dudra, Vancouver (CA)

(73) Assignee: Teleflex Canada Limited Partnership, Richmond (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/217,330

(22) Filed: Sep. 2, 2005

(65) Prior Publication Data

US 2005/0284523 A1    Dec. 29, 2005

Related U.S. Application Data

(63) Continuation of application No. 10/076,612, filed on Feb. 19, 2002, now Pat. No. 6,962,166.

(51) Int. Cl.
*F16K 37/00* (2006.01)
*B60T 17/22* (2006.01)

(52) U.S. Cl. ............... 137/558; 137/565.17; 137/574; 60/534; 60/585

(58) Field of Classification Search .............. 137/58, 137/565.17, 574; 60/534, 584, 585
See application file for complete search history.

(56) References Cited

U.S. PATENT DOCUMENTS

| | | | |
|---|---|---|---|
| 954,916 A | 4/1910 | Bewan | |
| 973,474 A | 10/1910 | Cameron | |
| 1,150,122 A | 6/1915 | Jeavons | |
| 1,304,195 A | 5/1919 | Noeth | |
| 3,483,656 A * | 12/1969 | Baumann | 137/558 |
| 4,028,444 A | 6/1977 | Brown et al. | |
| 4,355,512 A | 10/1982 | Kubota et al. | |
| 4,487,021 A | 12/1984 | Arakawa et al. | |
| 6,962,166 B2 * | 11/2005 | Dudra | 137/558 |

* cited by examiner

*Primary Examiner*—John Rivell
(74) *Attorney, Agent, or Firm*—Norman M. Cameron

(57) ABSTRACT

A hydraulic fluid reservoir and hydraulic pump combination has at least one hydraulic fluid port and includes a container with a hollow body having a top and a conduit having a bottom within the container and a top above the bottom. The conduit has an opening adjacent to the bottom of the conduit. The opening is spaced apart below the top of the container. A closure member is releasably, sealingly connected to the top of the conduit. Hydraulic fluid can be added to the container via the conduit up to the level of the opening of the conduit. Addition of further hydraulic fluid fills the conduit to the top thereof and the conduit overflows if additional hydraulic fluid is added after the top of the conduit is reached by the fluid. Preferably the container has a main interior chamber and a smaller chamber which is adjacent to one of the side walls of the container. The smaller chamber is has a bottom opening near the bottom of the smaller chamber which communicates with the main interior chamber. Hydraulic fluid enters the smaller chamber through the opening and reaches the level of hydraulic fluid in the main interior chamber. Bubbles in the hydraulic fluid within the main interior chamber are isolated from the smaller chamber and accordingly do not impair the reading of the hydraulic fluid level by a photo detector.

12 Claims, 5 Drawing Sheets

HYDRAULIC FLUID RESERVOIR AND HYDRAULIC SYSTEM

RELATED APPLICATION

This is a continuation application of U.S. patent application Ser. No. 10/076,612 filed on Feb. 19, 2002 now U.S. Pat. Ser. No. 6,962,166.

BACKGROUND OF THE INVENTION

This invention relates to hydraulic fluid systems and, in particular, to hydraulic fluid reservoirs having photodetectors for sensing fluid level and to reservoirs for use with unbalanced hydraulic cylinders.

Hydraulic reservoirs are common components for many hydraulic systems, for example for use in providing pressurized hydraulic fluid to hydraulic cylinders. One problem associated with such systems is ensuring that a proper level of fluid is maintained in the reservoir. One solution to this problem has been placing a photodetector in a position to detect the level of fluid in the reservoir through a transparent or translucent portion of the reservoir. The fluid is colored and this coloration assists the sensor in detecting the presence or absence of fluid within the container and accordingly the level of fluid. However, in practice air frequently becomes entrained in the fluid and causes the color of the fluid to lighten. This may confuse the sensor and may lead to incorrect readings on the level of the fluid within the reservoir.

Another problem associated with hydraulic reservoirs is the necessity in some systems to accommodate differential flows of fluids flowing into the reservoir and flowing out of the reservoir. This may occur, for example, when the reservoir is used in association with an unbalanced hydraulic cylinder. Such cylinders have a higher volume of fluid on the side of the piston opposite the piston rod compared to the side of the piston where the piston rod is located. This means that in one direction of movement of the cylinder, there is more fluid moving towards the cylinder, and out of the reservoir, than there is moving away from the cylinder and into the reservoir. In the opposite direction of movement of the cylinder, there is more fluid moving away from the cylinder and into the reservoir, than there is moving towards the cylinder and out of the reservoir. Accordingly there must be provision in such a reservoir to accommodate different levels of fluid which arise when the cylinder moves in different directions. Typically this is done by providing a vented reservoir. These are undesirable for some applications due to the possibility of contamination or loss of fluid through the vents. In theory an air space could be left in the reservoir to allow for additional fluid. However there is typically nothing to stop the user from overfilling the reservoir and reducing or eliminating the air space such that the reservoir can no longer accommodate additional fluid.

Accordingly it is an object of the invention to provide an improved hydraulic fluid reservoir which is configured so as to give an accurate fluid level reading to a photodetector.

It is another object of the invention to provide an improved hydraulic fluid reservoir which can be unvented, but yet reliably accommodate different volumes of fluid.

It is a further object of the invention to provide an improved combination hydraulic pump and reservoir which is rugged in construction, reliable in operation and economical to produce and sell.

SUMMARY OF THE INVENTION

According to the invention, there is provided a hydraulic fluid reservoir which includes a container having a hollow body with a top. There is at least one hydraulic fluid port and a conduit having a bottom within the container and a top above the bottom thereof. The conduit has an opening adjacent to the bottom of the conduit. The opening is spaced-apart below the top of the container. A closure member is releasably, sealingly connected to the top of the conduit. Hydraulic fluid can be added to the container via the conduit up to the level of the opening of the conduit. Addition of further hydraulic fluid fills the conduit to the top thereof and the conduit overflows if additional hydraulic fluid is added after the top of the conduit is reached by the fluid.

According to another aspect of the invention, there is provided a hydraulic fluid reservoir comprising a container with a top, a bottom, side walls, a main interior chamber and a smaller chamber adjacent to one of the side walls. The smaller chamber has a top and a bottom and is separated from the main interior chamber from the top of the smaller chamber to near the bottom thereof. There is a bottom opening near the bottom of the smaller chamber communicating with the main interior chamber. Hydraulic fluid enters the smaller chamber through the opening to the level of hydraulic fluid in the main interior chamber. Bubbles in hydraulic fluid within the main interior chamber are isolated from the smaller chamber.

According to a further object of the invention, there is provided a combination hydraulic pump and hydraulic fluid reservoir which includes a reservoir container having a hollow body with a top, a conduit having a bottom within the container and a top above the bottom thereof. The conduit has an opening adjacent to the bottom of the conduit. The opening is spaced-apart below the top of the container. A closure member is releasably, sealingly connected to the top of the conduit. Hydraulic fluid can be added to the container via the conduit up to the level of the conduit. Addition of further hydraulic fluid fills the conduit to the top thereof and the conduit overflows if additional hydraulic fluid is added after the top of the conduit is reached by the fluid. There is one hydraulic port and a hydraulic pump mounted on the container.

The invention provides distinct advantages compared with prior art hydraulic fluid reservoirs as well as reservoirs in combination with hydraulic pumps and reservoirs as parts of hydraulic fluid systems. By providing the conduit which extends below the top of the container for filling the container, overfilling is thereby prevented. An air space is left in the container in order to accommodate differential flows of fluids into and out of the container. Thus it is not necessary for the reservoir to be vented.

By providing the smaller chamber adjacent to the main interior chamber, a photodetector can read the level of fluid without the errors occurring from the presence of air entrained in the fluid. This gives significantly greater accuracy in detecting the level of fluid compared with some prior art hydraulic reservoirs.

At the same time, the construction of the reservoir is rugged and economical to produce and sell. Thus it is well adapted for high-volume consumer applications such as trim pumps on marine craft. Because the reservoir is unvented, it allows the pump to be oriented on its side.

DETAILED DESCRIPTION OF THE PREFERRED EMBODIMENTS

Figure 1:
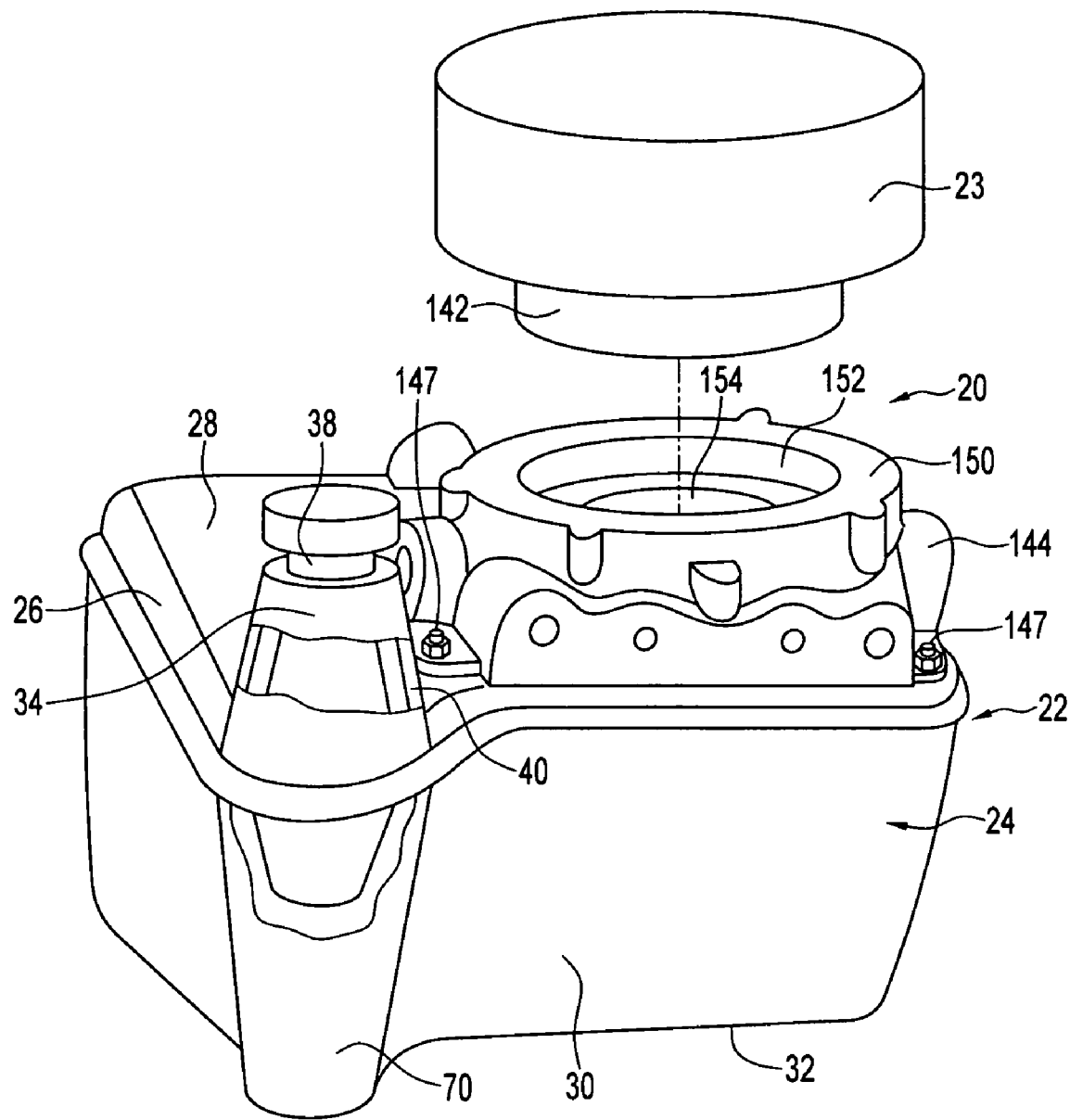
FIG. 1 is an isometric view of a combination hydraulic fluid reservoir and hydraulic pump, showing the pump removed from the reservoir.

Referring to the drawings, and first to FIG. 1, the shows a combination 20 of a hydraulic fluid reservoir 22 and a hydraulic fluid pump 23. The reservoir 22 includes a container 24 having a top portion 26 with a top 28 and a bottom portion 30 with a bottom 32. The container in this example is of polyethylene although polypropylene, other plastics or other materials could be substituted.

Figure 2:
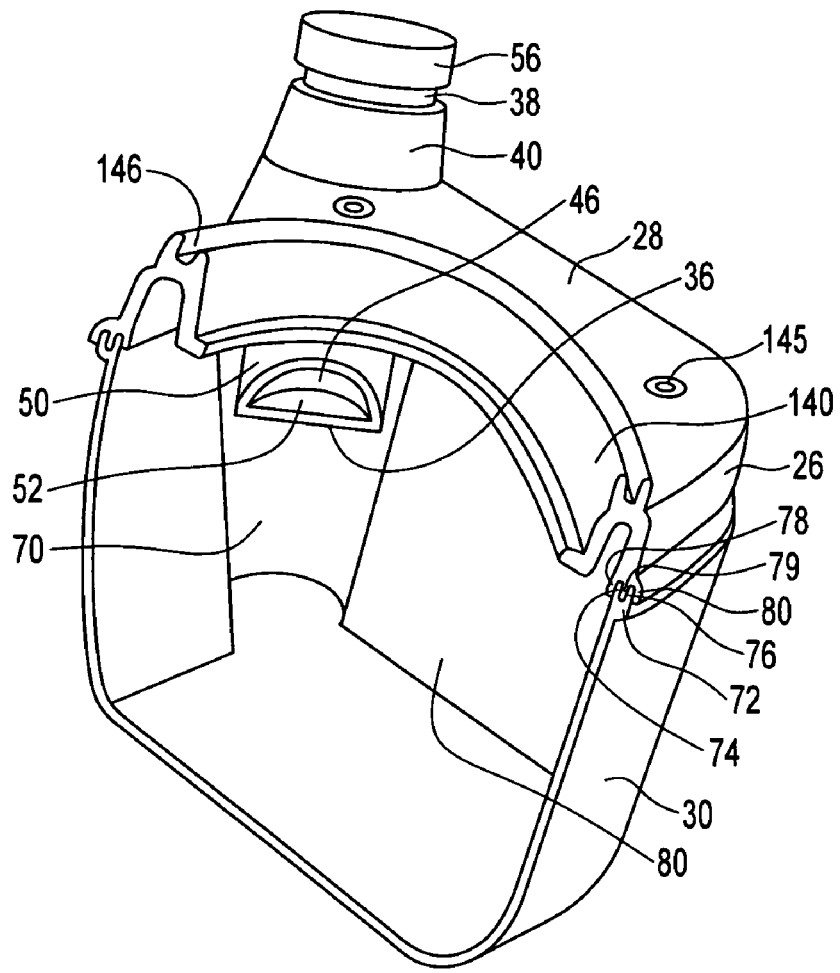
FIG. 2 is a fragmentary isometric view showing the interior and filler conduit of the container of the reservoir.

The reservoir includes a filler conduit 34 which has a bottom 36 within the container as seen in FIG. 2. The conduit has a top 38 which is above the bottom of the conduit. As seen best in FIGS. 2 and 3, the conduit is tubular and tapers towards the bottom in this example although this is not critical. The conduit is integral with top portion 26 of the container in this example and is connected to an upwardly extending, annular part 40 of the top portion of the container as seen best in FIGS. 2 and 3. A series of spaced-apart flanges 42 extend between the annular part 40 of the top and the conduit.

Figure 3:
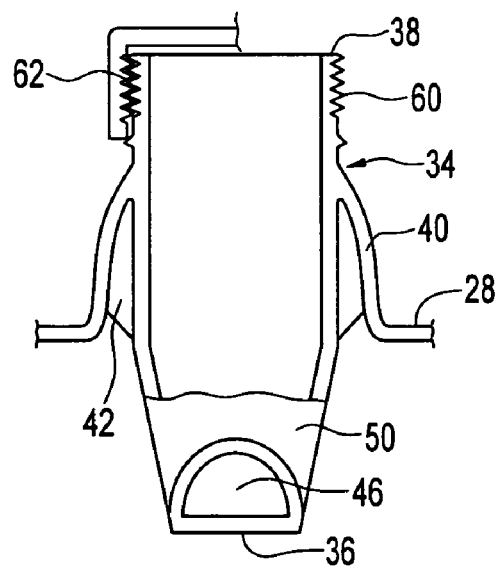
FIG. 3 is a fragmentary, elevational view thereof, partly broken away, showing the filler conduit.

There is an opening 46 adjacent to the bottom of the conduit which is spaced-apart from the top 28 of the container as seen best in FIG. 3. The opening is formed at an acute angle with cylindrical side wall 50 of the conduit as seen best in FIG. 2. There is a bottom surface 52 on the conduit which extends part way across the bottom 36 of the conduit from the side wall 50 to the opening 46. This is visible from the top of the conduit when the cap is removed.

The container also includes a cap or closure member 56 which is releasably, sealingly connected to the top of the conduit by means of male threads 60 adjacent to the top of the conduit and corresponding female threads 62 within the cap as seen in FIG. 3. The cap can be removed to add hydraulic fluid to the reservoir by unscrewing it from conduit.

The bottom portion 30 of the container 24 is generally rectangular in plan in this example and has a semi-cylindrical protrusion 70, shown in FIGS. 1 and 2, which extends about the conduit. The bottom portion has a top 72 with a pair of spaced apart flanges 74 and 76 shown in FIG. 2. Top portion 26 has three spaced apart flanges 78, 79 and 80 which intermesh with the flanges 74 and 76 of the lower portion. A suitable adhesive is placed therebetween to provide a sealing fit between the upper portion and the lower portion of the container.

Figure 5:
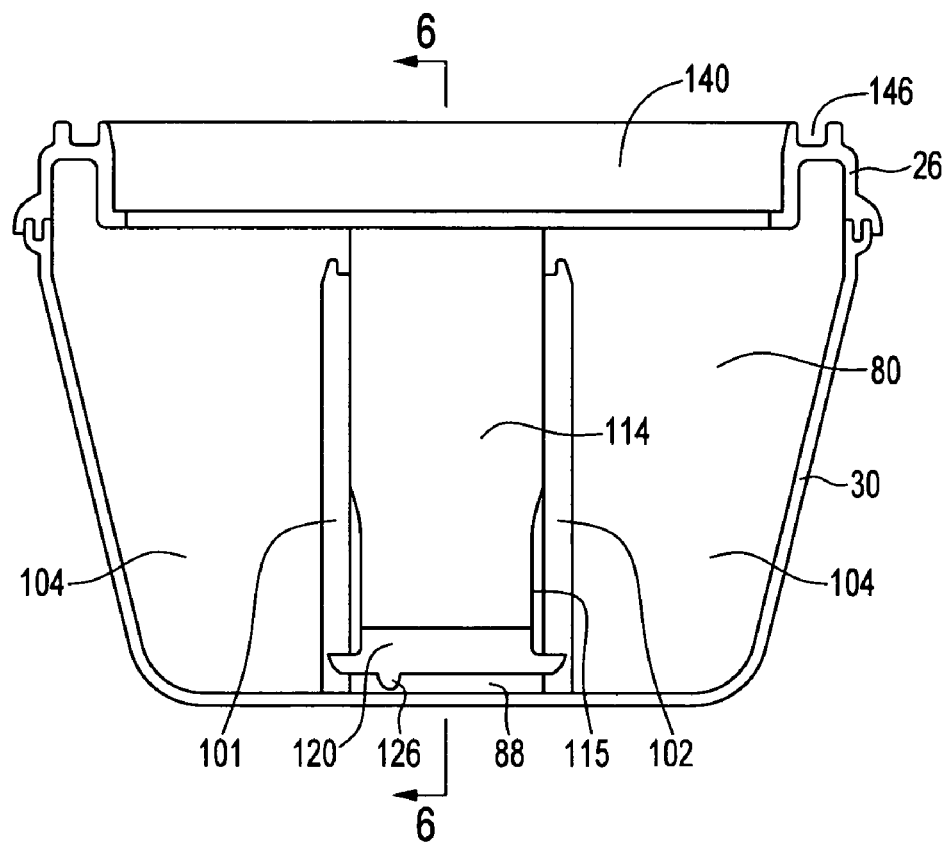
FIG. 5 is a sectional view showing the smaller chamber and a portion of the main interior chamber of the reservoir container.
Figure 6:
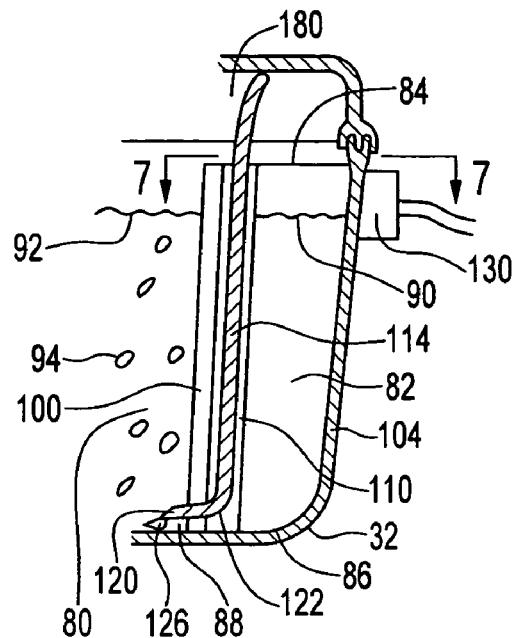
FIG. 6 is a sectional view along line 6—6 of FIG. 5.

The container 24 has a main interior chamber 80, shown in FIGS. 2 and 5, which occupies the bulk of the interior thereof. There is also a smaller chamber 82, shown in FIGS. 6 and 7, which is separated from the main interior chamber from open top 84 of the chamber to bottom 86 thereof. There is a bottom opening 88, best shown in FIG. 5 and FIG. 6, which permits communication with the main interior chamber. Hydraulic fluid can enter the smaller chamber from the main interior chamber through this opening and thus the level 90 of hydraulic fluid within the smaller chamber becomes the same as level 92 of hydraulic fluid in the main interior chamber as seen in FIG. 6. At the same time, bubbles 94 in the hydraulic fluid within the main interior chamber are isolated from the smaller chamber.

Figure 7:
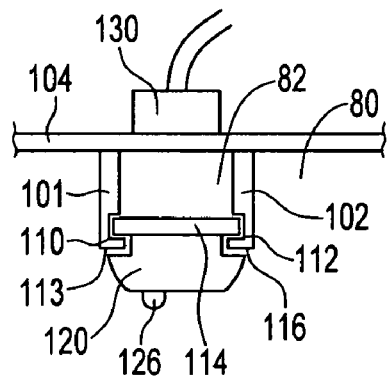
FIG. 7 is a top, fragmentary plan view thereof showing the smaller chamber.

The smaller chamber has two side walls 101 and 102 which are best shown in FIGS. 5 and 7. These walls are integral with the lower portion of the container 24 and extend from side wall 104 of the container, vertically and perpendicularly in this example although this is not critical and may vary in different examples. In this example the side walls 101 and 102 are parallel to each other and have longitudinal slots 110 and 112 extending vertically near outer edges 113 and 116 thereof. There is a third side wall 114 which extends between the side walls 101 and 102 and is spaced-apart from the side wall 104 of the container. The third side wall is tongue-like and extends downwardly from top 28 of the container. The third side wall fits within the slots 110 and 112 of the side walls 101 and 102. However it has a lower, narrower portion 115, best shown in FIG. 5, which extends outwardly from the slots between the side walls 101 and 102. There is a fin-like deflector 120, shown in FIGS. 5, 6 and 7, which extends outwardly from bottom 122 of the side wall 114 in a generally horizontal orientation. The deflector is wider than the distance between the side walls 101 and 102 so as to remain within the main interior chamber 80. The deflector in this example is generally trapezoidal although it may be other shapes in other examples. There is a small foot 126 extending outwardly and downwardly from the deflector as shown in FIGS. 5, 6 and 7. This keeps the deflector spaced-apart from bottom 32 of the container so as to keep opening 26 clear. The deflector keeps air bubbles circulating in the main interior chamber from entering the smaller chamber.

There is a photodetector 130 mounted on the side wall 104 near the top 84 of the smaller chamber 82 during filling of the container. The photodetector is selected so it is sensitive to the coloration of hydraulic fluid in the container and accordingly senses the level of hydraulic fluid in the container. The sensor is connected to a warning device, such as a light, which indicates when the level of hydraulic fluid drops below the level of the sensor.

Figure 4:
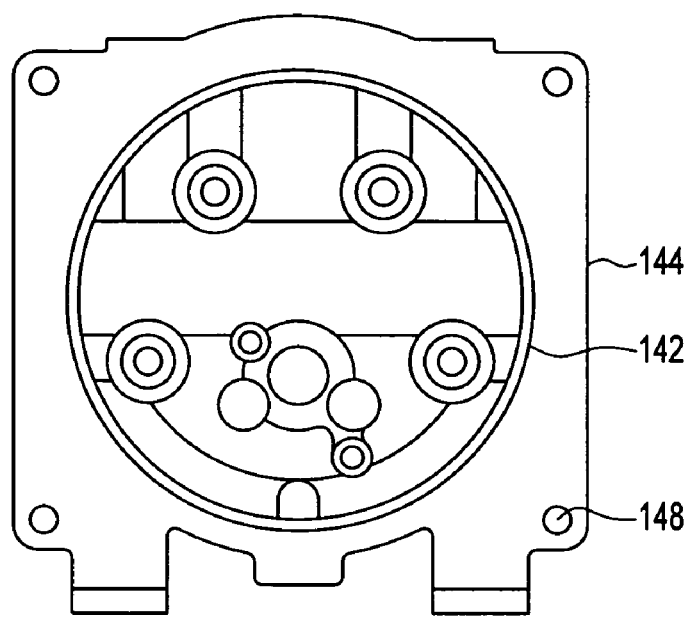
FIG. 4 is a bottom plan view of the pump mount thereof.

There is a large circular aperture 140 in the top 28 of the container as seen in fragment in FIGS. 2 and 5. This sealingly receives cylindrical bottom extension 142 of hydraulic pump mount 144 seen in FIGS. 4, 9 and 10. The hydraulic pump mount fits on top 28 of the container and in this example is an aluminum casting although other materials could be substituted. A circular seal (not shown) fits within annular groove 146 extending about the aperture 140. Threaded metal inserts 145, brass in this example, are fitted within apertures in the top of the container as seen in FIG. 2. Bolts 147, shown in FIG. 1, extend through apertures 148 of the pump mount to connect the pump mount to the container. The pump mount has a top 150 with a cylindrical recess 152 as seen in FIG. 1. There is an aperture 154 extending through the center of the recess.

Figure 8:
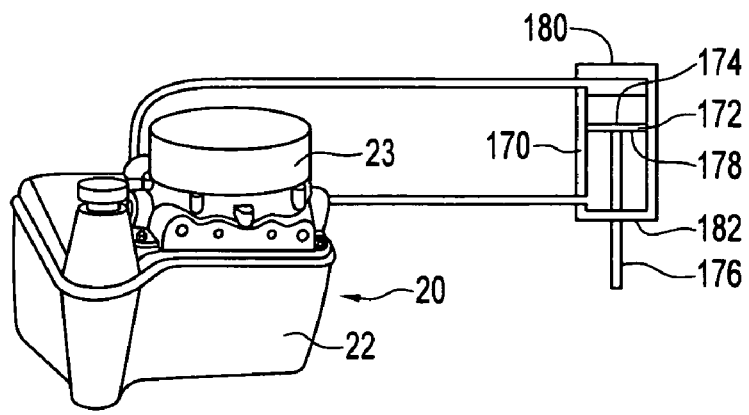
FIG. 8 is a simplified, diagrammatic view of a hydraulic system including the combination reservoir and hydraulic pump of FIG. 1 and an unbalanced hydraulic cylinder.

FIG. 8 shows a hydraulic system including the combination 20 of reservoir 22 and pump 23. These are connected to a hydraulic cylinder 170 which is an unbalanced cylinder in this example. A typical application would be a tilt cylinder for a marine stern drive, such as an inboard/outboard drive. It may be observed that piston 172 has a larger area on side 174, which is opposite the piston rod 176, than on side 178 where the rod is mounted. This is because of the space occupied by the rod. This means that more hydraulic fluid moves into and out of end 180 of the cylinder compared to end 182 when the piston moves back and forth.

Figure 9:
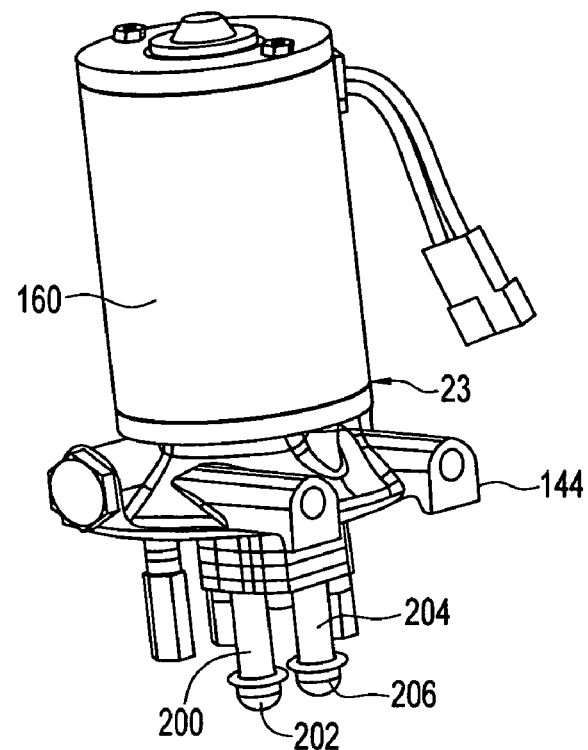
FIG. 9 is an isometric view, from one side, of the pump and pump mount assembly.
Figure 10:
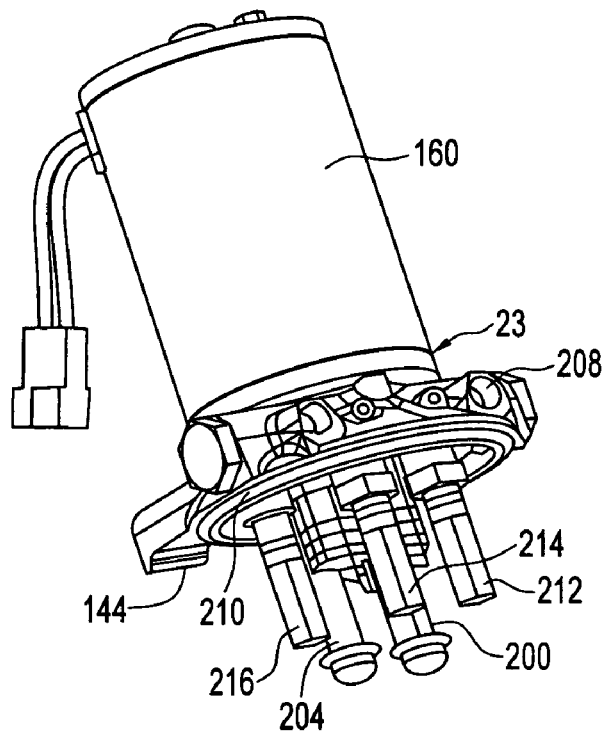
FIG. 10 is an isometric view thereof from the side opposite the one side.

Referring to FIGS. 9 and 10, a tube 200 extends from the pump mount into the container for intaking fluid for the "up" movement of the rod 176. Tube 200 in this example is of aluminum and has a brass screen 202. There is a similar tube 204 and screen 206 for intaking fluid for the "down" direction. Port 208 discharges fluid for the "up" direction while port 210 discharges fluid for the "down" direction. Tube 212 is for "up" pressure relief, while tube 214 is for "down" pressure relief. Tube 216 is for thermal pressure relief.

In operation, the reservoir is filled with hydraulic fluid by removing cap 56 and pouring the hydraulic fluid through the filler conduit 34 until it reaches the level of bottom surface 52 of the conduit shown in FIG. 2. If through inadvertence additional fluid is poured into the conduit, it reaches the top of the opening 46 and prevents more air from exiting the container through the conduit. The reservoir is sealed, apart from the filler conduit, when the pump is mounted on the pump mount 144 and the various hydraulic lines are connected to the pump and mount. Accordingly, additional hydraulic fluid cannot enter the main chamber of the container after the air in space 180 above the level 92 of the hydraulic fluid is compressed slightly. Thus the addition of more hydraulic fluid simply fills the conduit until it reaches top 38 thereof shown in FIG. 3. Any more fluid would simply spill over. In this way, the air space 180, shown in FIG. 6, is maintained to accommodate different volumes of hydraulic fluid moving into and out of the reservoir due to the unbalanced hydraulic cylinder 170. The reservoir may also be useful in other hydraulic systems to accommodate different volumes of hydraulic fluid while maintaining a sealed reservoir. For example, it is useful in systems where the volume varies due to thermal expansion and contraction of the fluid.

The fluid from the main chamber enters the smaller chamber 82 through opening 88 as the main chamber is filled with fluid. Eventually the level of fluid 90 in the smaller chamber reflects the correct level of fluid 92 in the main chamber. Once the fluid has reached the level 90, the presence of fluid is detected by photodetector 130. This typically turns off a warning light which, when illuminated, indicates when the level of fluid in the reservoir is low. As discussed above, any air bubbles 94 in the main container tend to rise and accordingly do not tend to pass through the opening 88 adjacent to the bottom 86 of the container. Any bubbles which move towards the opening are deflected away by deflector 120. Thus hydraulic fluid within the smaller chamber 82 remains clear and is not subject to color changes due to air entrainment. This improves the accuracy of the photodetector.

It will be understood by someone skilled in the art that many of the details above are provided by way of example only and can be altered or deleted without departing from the scope of the invention as set forth in the following claims.

What is claimed is:

1. A hydraulic fluid reservoir comprising a container with a top, a bottom, side walls, a main interior chamber and a smaller chamber interior to the container and adjacent to one of the side walls, the smaller chamber having an open top and a bottom and the smaller chamber being separated from the main interior chamber from the top of the smaller chamber to near the bottom thereof, a bottom opening near the bottom of the smaller chamber communicating with the main interior chamber, and the smaller chamber having a deflector adjacent to the bottom opening thereof, whereby hydraulic fluid enters the smaller chamber through the opening up to the level of hydraulic fluid in the main interior chamber, but bubbles in the hydraulic fluid within the main interior chamber are isolated from the smaller chamber.

2. A hydraulic fluid reservoir as claimed in claim 1, wherein the deflector is spaced-apart from the bottom of the container.

3. A hydraulic fluid reservoir as claimed in claim 2, wherein the deflector is fin-like, extends generally parallel to the bottom of the container and is above the bottom opening of the smaller chamber.

4. A hydraulic fluid reservoir comprising a container with a top, a bottom, side walls, a main interior chamber and a smaller chamber interior to the container and adjacent to one of the side walls, the smaller chamber having an open top and a bottom and the smaller chamber having side wails, one of the side walls of the smaller chamber comprising a portion of one of the side walls of the container, the smaller chamber being separated from the main interior chamber from the top of the smaller chamber to near the bottom thereof, a bottom opening near the bottom of the smaller chamber communicating with the main interior chamber, whereby hydraulic fluid enters the smaller chamber through the opening up to the level of hydraulic fluid in the main interior chamber, but bubbles in the hydraulic fluid within the main interior chamber are isolated from the smaller chamber.

5. A hydraulic fluid reservoir comprising a container with a top, a bottom, side walls, a main interior chamber and a smaller chamber interior to the container and adjacent to one of the side walls, a top of The main interior chamber being adjacent to the top of the container and the main interior chamber having a top opening at the top thereof, the smaller chamber having an open top and a bottom and the smaller chamber being separated from the main interior chamber from the top of the smaller chamber to neat the bottom thereof, a bottom opening near the bottom of the smaller chamber communicating with the main interior chamber, and a photodetector being mounted adjacent to said one of the side walls of the container and adjacent to the smaller chamber to detect a level of fluid within the smaller chamber and thereby a level of fluid within the container, whereby hydraulic fluid enters the smaller chamber through the opening up to the level of hydraulic fluid in the main interior chamber, but bubbles in the hydraulic fluid within the main interior chamber are isolated from the smaller chamber.

6. A hydraulic fluid reservoir as claimed in claim 5, wherein the container has a top portion and a bottom portion and the smaller chamber has two said side walls thereof extending outwardly from said one side wall of the container and being integral with the bottom portion of the chamber, the reservoir having another side wall extending between said two side walls thereof and spaced-apart from said one side wall of the container, said another side wall being integral with the top portion of the container.

7. A hydraulic fluid reservoir as claimed in claim 6, wherein the deflector is integral with another said side wall of the smaller chamber.

8. A combination pump and hydraulic fluid reservoir comprising a container with a top, a bottom, side walls, a main interior chamber and a smaller chamber interior to the container and adjacent to one of the side walls, the smaller chamber having an open top and a bottom, the smaller chamber being separated from the main interior chamber from the top of the smaller chamber to near the bottom thereof, a bottom opening near the bottom of the smaller chamber communicating with the main interior chamber, and the smaller chamber having a deflector adjacent to the bottom opening thereof, whereby hydraulic fluid enters the smaller chamber through the opening up to the level of hydraulic fluid in the main interior chamber, but bubbles in the hydraulic fluid within the main interior chamber are isolated from the smaller chamber.

9. A hydraulic fluid reservoir as claimed in claim 8, wherein the deflector is spaced-apart from the bottom of the container.

10. A combination as claimed in claim 9, wherein the deflector is fin-like, extends generally parallel to the bottom of the container and is above the bottom opening of the smaller chamber.

11. A combination pump and hydraulic fluid reservoir comprising a container with a top, a bottom, side walls, a main interior chamber and a smaller chamber interior to the container and adjacent to one of the side walls, the smaller chamber having an open top and a bottom and the smaller chamber having side walls, one of the side walls of the smaller chamber comprising a portion of one of the side walls of the container, the smaller container being separated from the main interior chamber from the top of the smaller chamber to near the bottom thereof, a bottom opening near the bottom of the smaller chamber communicating with the main interior chamber, whereby hydraulic fluid enters the smaller chamber through the opening up to the level of hydraulic fluid in the main interior chamber, but bubbles in the hydraulic fluid within the main interior chamber are isolated from the smaller chamber.

12. A combination pump and hydraulic fluid reservoir comprising a container with a top, a bottom, side walls, a main interior chamber and a smaller chamber interior to the container and adjacent to one of the side walls, the smaller chamber having an open top and a bottom, the top of the smaller chamber being adjacent to the top of the container and the smaller chamber having a top opening at the top thereof, the smaller chamber being separated from the main interior chamber from the top of the smaller chamber to near the bottom thereof, a bottom opening near the bottom of the smaller chamber communicating with the main interior chamber, the container having a top portion and a bottom portion and the smaller chamber having two said side walls thereof extending outwardly from one said side wall of the container and said two sides wall of the smaller chamber being integral with the bottom portion of the container, the reservoir having another side wail extending between said two side walls thereof and spaced-apart from said one side wall of the container, said another side wall being integral with the top portion of the container, a photodetector being mounted adjacent to said one of the side walls of the container and adjacent to the smaller chamber to detect a level of fluid within the smaller chamber and thereby a level of fluid within the container, whereby hydraulic fluid enters the smaller chanter through the opening up to the level of hydraulic fluid in the main interior chamber, but bubbles in the hydraulic fluid within the main interior chamber are isolated from the smaller chamber.

\* \* \* \* \*